United States Patent
Bradshaw et al.

(10) Patent No.: US 8,367,759 B2
(45) Date of Patent: Feb. 5, 2013

(54) HIGH POST CONSUMER CONTENT MINERAL FILLER BASED ON MICRONIZED RECYCLED ASPHALT PAVING AND THERMOPLASTIC COMPOSITIONS AND POLYMERIC EMULSIONS DERIVED FROM SAME

(76) Inventors: Howard Grant Bradshaw, Douglasville, GA (US); Jim Frederick Fisher, Singhampton, CA (US); John Hinton Waters, Chatsworth, GA (US)

(*) Notice: Subject to any disclaimer, the term of this patent is extended or adjusted under 35 U.S.C. 154(b) by 0 days.

(21) Appl. No.: 13/025,638

(22) Filed: Feb. 11, 2011

(65) Prior Publication Data

US 2011/0197788 A1    Aug. 18, 2011

Related U.S. Application Data

(60) Provisional application No. 61/337,774, filed on Feb. 12, 2010.

(51) Int. Cl.
*C08K 3/30*    (2006.01)
*C08K 3/00*    (2006.01)

(52) U.S. Cl. .................................. 524/423; 524/427

(58) Field of Classification Search .................. 524/423
See application file for complete search history.

(56) References Cited

U.S. PATENT DOCUMENTS

| | | | |
|---|---|---|---|
| 5,340,391 | A | 8/1994 | Grzybowski |
| 6,635,705 | B2 | 10/2003 | Itoh et al. |
| 7,393,897 | B2 | 7/2008 | Ito |
| 7,758,235 | B1 | 7/2010 | Collette |
| 7,833,339 | B2 | 11/2010 | Whitaker et al. |
| 8,198,350 | B2 * | 6/2012 | Fee et al. ................ 524/68 |
| 2008/0071032 | A1 | 3/2008 | Massari et al. |
| 2010/0004401 | A1 | 1/2010 | Ito et al. |

* cited by examiner

*Primary Examiner* — Hui Chin
(74) *Attorney, Agent, or Firm* — Ashley Law Firm P.C.; Stephen S. Ashley, Jr.

(57) ABSTRACT

A micronized filler for use in thermoplastic compositions, polymeric emulsions and other end products can include micronized recycled asphalt paving. The recycled asphalt paving filler can include calcium carbonate, calcium magnesium carbonate and silicon dioxide. The filler can have a particle size of 325 mesh screen, and a specific gravity of 2.4. The filler increases the post consumer content of various end products.

17 Claims, 1 Drawing Sheet

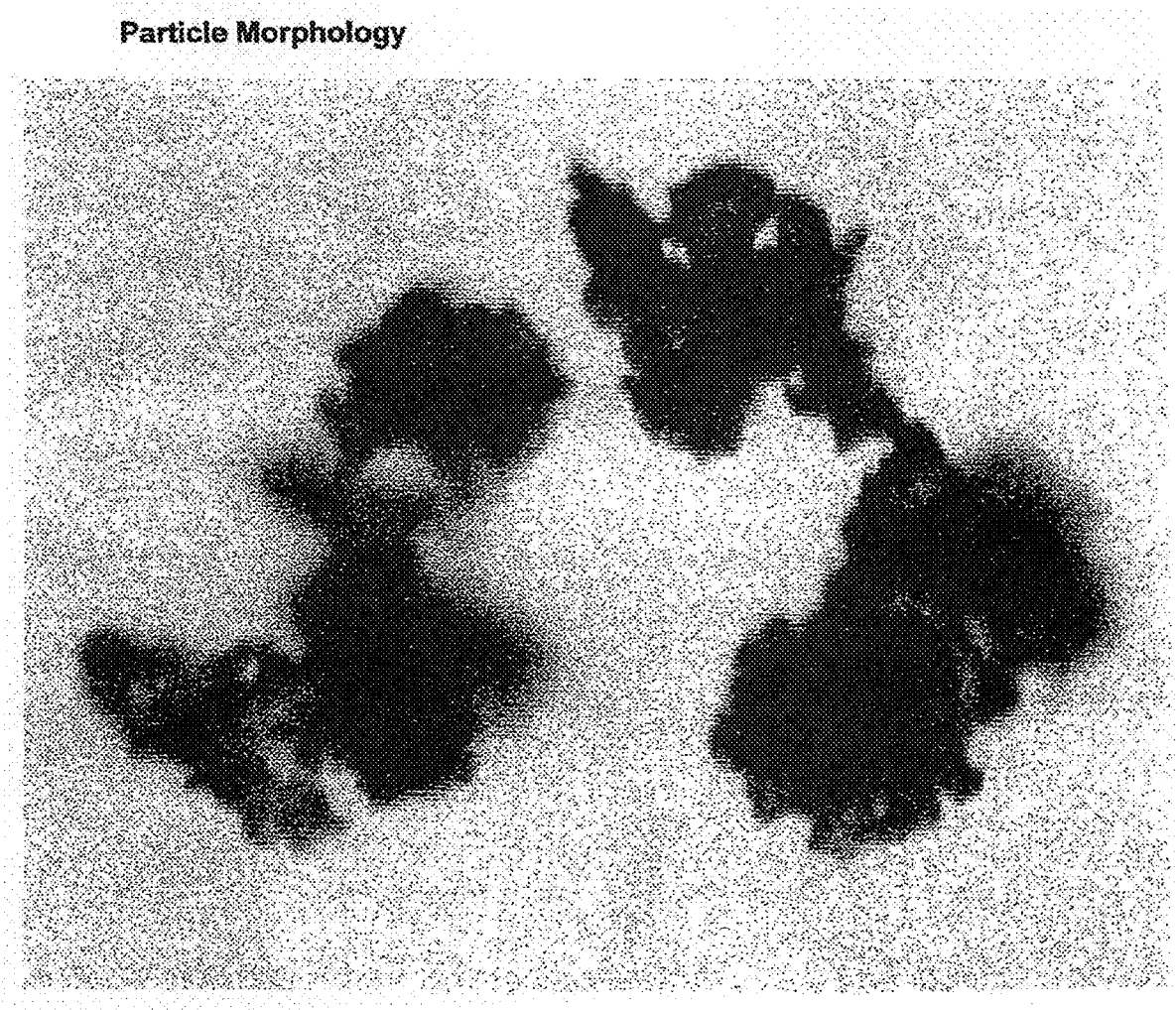

HIGH POST CONSUMER CONTENT MINERAL FILLER BASED ON MICRONIZED RECYCLED ASPHALT PAVING AND THERMOPLASTIC COMPOSITIONS AND POLYMERIC EMULSIONS DERIVED FROM SAME

This application claims priority to U.S. Provisional Patent Application No. 61/337,774, filed Feb. 12, 2010, which is incorporated herein. The present invention relates to an elastomeric polyolefin composition and other polymeric compositions possessing a post consumer recycled asphalt filler.

TECHNICAL FIELD AND BACKGROUND OF THE INVENTION

Compounding of thermoplastic polymers is commonly carried out by the addition of numerous mineral fillers, which are employed to enhance physical properties, improve the material processing characteristics, and lower the material cost. Such fillers include, calcium carbonate. magnesium hydroxide, barium sulfate, magnesium silicate et al. Such mineral fillers are commonly processed to a fineness, in which 1-100% of the material will pass a 325 or finer mesh screen.

Additionally, it is common practice to add and suspend similar mineral fillers of similar or coarser particle size described above to latex or acrylic based emulsions, polyurethane, plastisol polyvinyl chloride and ethylene vinyl acetate hot melt adhesives which are commonly used to pre-coat and back coat textile, rug and carpet constructions so that such constructions are imparted with useful mechanical properties but with significantly improved economics and high post consumer content. Such latex and acrylic based emulsions, polyurethane, plastisol polyvinyl chloride and ethylene vinyl acetate hot melt adhesives can be used to also permanently adhere one layer of the construction to another layer resulting in desired end use properties such as dimensional stability, stiffness and abrasion resistance. Typically, when you disperse or suspend higher levels of a mineral filler into polymer melts, emulsion type polymers, or polymer solutions, the filler will stiffen the polymer composition and cause the polymeric composition to harden (increase in the shore hardness for example) relative to increased concentration levels of the fillers.

SUMMARY OF THE INVENTION

One embodiment of the invention comprises a composition comprising an elastomeric polyolefin, and an asphalt filler.

According to another embodiment of the invention, the asphalt filler comprises calcium carbonate.

According to another embodiment of the invention, the asphalt filler comprises calcium magnesium carbonate.

According to another embodiment of the invention, the asphalt filler comprises silicon dioxide.

According to another embodiment of the invention, the asphalt filler comprises 45-95% by weight calcium carbonate.

According to another embodiment of the invention, the asphalt filler comprises 1-50% by weight calcium magnesium carbonate.

According to another embodiment of the invention, the asphalt filler comprises 1-15% by weight silicon dioxide.

According to another embodiment of the invention, the asphalt filler has a particle size of about 325 mesh screen.

According to another embodiment of the invention, the asphalt filler is comprised of recycled asphalt paving.

According to another embodiment of the invention, the asphalt filler is derived from limestone gravel According to another embodiment of the invention, a composition comprises an elastomeric polyolefin, and a filler comprised of recycled asphalt paving comprising calcium carbonate.

According to another embodiment of the invention, the recycled asphalt paving includes calcium magnesium carbonate and/or silicon dioxide.

According to another embodiment of the invention, the recycled asphalt filler has a particle size of about 325 mesh screen.

According to another embodiment of the invention, the recycled asphalt filler of about 2.0-4.0.

According to another embodiment of the invention, a micronized recycled asphalt filler for use in thermoplastic compositions and polymeric emulsions comprises 45-95% by weight calcium carbonate, 1-50% by weight of calcium magnesium carbonate, and 1-15% by weight of silicon dioxide.

BRIEF DESCRIPTION OF THE DRAWINGS

FIG. 1 is a perspective view showing particle morphology of an asphalt based filler according to a preferred embodiment of the invention.

DESCRIPTION OF THE PREFERRED EMBODIMENTS OF THE INVENTION AND BEST MODE

A preferred embodiment of the invention involves the processing and utilization of a specialized mineral filler in which recycled asphalt paving (RAP) is micronized to about 325 mesh by conventional mineral processing technology for use in the inclusion in thermoplastic, latex and acrylic compositions, polyurethane compositions, plastisol polyvinyl chloride liquid compositions and ethylene vinyl acetate hot melt adhesives. The RAP utilized can be sourced predominantly from areas in which asphalt aggregate is derived from limestone gravel or other like mineral aggregates of similar hardness.

Asphalt being comprised of mineral aggregate, and asphalt cement is a composite of organic and inorganic matter. In its micronized state the organic content acts a as compatibilizer to aid solubility of the inorganic filler in organic substrates such as polyolefin thermoplastics, such as ethylene vinyl acetate, polyethylenes and latex emulsions. The presence of the organic content of the asphalt acting to coat the polar mineral aggregate present allows for ease of mechanical inclusion or dispersion of the high concentrations of mineral aggregate into polymer compounds, allowing higher filler capacity and therefore higher post consumer content. Asphalt cement is comprised of high molecular weight polycyclic aromatic hydrocarbons and behaves as an amorphous thermoplastic material. As a thermoplastic polymer it aids in the homogenization and viscosity reduction of compounded thermoplastic resins. Additionally, it has been discovered that micronized RAP's can be used effectively at 50% or greater addition by weight in latex and acrylic emulsions, polyurethane, plastisol polyvinyl chloride and ethylene vinyl acetate hot melt adhesives for pre-coating and back coating one or more layers of fibrous and non-fibrous composites such as carpet and fiber reinforced panels.

In a preferred embodiment of the invention, recycled asphalt paving (RAP) is grounded to a particle size in which 30-100% of the RAP can pass a 325 mesh screen, or approximately 18-45 microns. The micronized RAP can be used as filler for carpet backing, replacing virgin mineral filler, thereby substantially increasing the recycled post consumer content of the final carpet product to approximately 50-70%. The micronized RAP can also be used as filler in textile backings, such as needle punch type nonwovens, electrostatic applications, and needle punch carpet tiles. The micronized RAP can be used as filler in styrene butadiene rubber (SBR) latex, ethylene vinyl acetate (EVA) latex, polypropylene resins for various textile applications, polypropylene/polyethylene resins for various textile applications, polyvinyl chloride (PVC) compounds for textile applications, and various extruded resins used to back coat textile and related fibrous applications.

Another preferred embodiment of the invention comprises an elastomeric polyolefin composition having a ground up post consumer asphalt filler. The composition can be used in practical applications, such as carpet backing cap coats. Novel properties of the composition include higher degrees of flexibility (lower flexural modulus) and lower shore hardness when the micronized post consumer asphalt filler concentration levels are higher (40% to 90%) by weight. In addition to the desirable mechanical properties, the olefinic contaminants in the RAP act as processing aids and natural dispersing/compatilizing agents with the host olefin polymers allowing higher filler levels to be more readily achieved during twin screw compounding (and other higher shear polymer extrusion processing like Banbury mixers and Farrel continuous mixers). This ease of extrusion processing is further enhanced by the co-addition of certain low cost naturally occurring, unmodified micronized mineral fillers such as 325 mesh barium sulfate. As such, combining the 325 mesh or smaller RAP with the lesser amount of 325 or smaller Barium sulfate allows the highest levels of filler with optimal properties and extreme ease of extrusion processing. Still, other formulations can include similar high levels of recycled asphalt filler that contain 60% or more of the post consumer recycled asphalt filler by using lower melt flow carrier resins, such as less than 10 melt flow index (MFI) or melt flow rate. The RAP can be made using ground up limestone as a filler, such as disclosed in U.S. Pat. No. 4,459,157, which is incorporated herein.

It is believed that the effective dispersion of the RAP in the polyolefin polymers is due to the RAP containing low molecular weight organic species, such as Bitumens and other olefins, that are present in the RAP and compatible with the polyolefin polymers in which they are dispersed. The lower molecular weight organic species present in the RAP act to "coat" (or surface treat) the mineral fillers (predominantly Calcium carbonate in the lime stone), which makes a polar substrate species, such as Calcium carbonate hydrophobic, allowing it to be readily dispersed in the hydrophobic polyolefin. Typically, non-surface treated calcium carbonate is difficult to disperse in a polyolefin since it is so polar. The same inherent surface treatment allowing ease of dispersion in emulsions may also be true for the emulsions that are prepared for the other carpet backings.

The following testing was done comparing an example of a polyolefin elastomeric formulation comprising recycled asphalt filler according to an embodiment of the invention (sample 2 below) and a polyolefin elastomeric formulation comprising virgin barium sulfate filler (sample 1 below). The two samples and a control were weighed to the correct percentages by weight and dry blended in a drum using a tumble blender until all ingredients were uniformly mixed.

Control
100% Engage 8407 (a 30 MFI alpha olefin polyethylene elastomer)
Sample 1
65.000% Virgin Barium Sulfate (325 mesh)
1.000% Olefinic Processing Oil
0.999% Polypropylene Homopolymer (20 MFR)
0.001% Polyfluoroelastomer Processing Aid
33.000% alpha olefin low density polyethylene elastomer (35 MFR "Engage" from Dow Chemical)
Sample 2
20.000% Barium Sulfate (325 mesh)
45.000% 325 Mesh Micronized Recycled Asphalt Filler
1.000% Olefinic Processing Oil
0.999% Polypropylene Homopolymer (20 MFR)
0.001% Polyfluoroelastomer Processing Aid
33.000% alpha olefin low density polyethylene elastomer (30 MFI "Engage 8407" from Dow Chemical)

Both the Samples 1 and 2 were then each independently extrusion processed using a heat profile sufficient to properly melt mix and disperse the ingredients into a homogenous blend using a 25 mm twin screw co-rotator extruder where the extrudate was extruded in strand form, the strands were water bath quenched and then the strands were fed into a high speed knife cut pelletizer were the resultant pellets were then collected. The pellets were then allowed to air dry until any residual moisture had sufficiently evaporated and the pellets were then dry to the touch. The control, Sample 1 and Sample 2 pellets were then each independently tested to determine the melt flow rate of the composition pellets as well as the Shore A hardness. The melt flow index of the control and samples were determined using standard test method ASTM D1238 and the Shore A hardness was determined using ASTM D 2240. The following results were obtained:

|  | MFR | Shore A Hardness |
| --- | --- | --- |
| Control Resin: | 30 | 67→65 (15 seconds) |
| Sample 1: | 7.0 | 94→93 (15 seconds) |
| Sample 2: | 47.0 | 74→72 (15 seconds) |

The melt flow index of the Sample 1 was severally affected measuring 7.0 when compared to the unmodified host control resin, because of the presence of 65% untreated virgin mineral filler (barium sulfate) as the host polymer (the Control, engage 8407, an alpha olefin low density polyethylene elastomer) original melt flow index was 30 grams per 10 minutes at 190 degrees Celsius. Also, Sample 1 was much harder compared to the control resin as the Shore A hardness increased significantly from 67 to 94 due to the presence of such high levels of the virgin untreated mineral filler (barium sulfate). Unexpectedly, Sample 2 had a dramatically higher melt flow compared to the control resin despite the presence of 65% total mineral filler content. This desirable increase in melt flow of the overall polymer composition containing 45% recycled asphalt mineral filler and 20% barium sulfate virgin filler is an extremely important shift in the rheological properties due to the ease of extrusion processing that is now possible if the pellets from Sample 2 are further melt extrusion processed using a variety of possible techniques known to one skilled in the art. Because the melt flow of Sample 2 is higher relative to the control host polymer when combined with a high mineral filler content, products can be melt extrusion processed, molded and shaped with much higher rates of production, lower energy consumption, very low cost economics and contain high post consumer content recycled asphalt filler. Even more unexpected, the hardness of Sample 2 is in significant contrast to the hardness of a similar polyolefinic composition made from virgin fillers alone, such as Sample 1.

Typically, when high virgin filler content is present (greater than 50% by weight), the host polymer (the Control in this case) will become increasingly harder and harder relative to higher and higher concentrations of the filler that may be added as is seen in sample #1 where the shore A hardness of the host polymer (control resin) is 67 when no mineral filler is present but increases significantly (Shore A=94) due to the presence of 65% virgin barium sulfate filler. However, in the presence of the same total concentration of filler (65%) where a portion of the filler (45%) is composed of the recycled asphalt filler and the balance of the filler (20%) is the virgin barium sulfate, the presence of the recycled asphalt has a dramatic impact on the shore A hardness of the filled polymer composition and the Shore A hardness only increases from 67 to 74 Shore A. This unexpected and significant result indicates that thermoplastic and possibly other kinds of polymer compositions containing high concentration levels of recycled asphalt filler retain the lower shore hardness and flexibility of the host polymers original properties to a much greater extent compared to using virgin mineral fillers alone. This is important because retaining a low shore hardness and higher degrees of flexibilities results in products that are produced from such specially filled polymer compositions that will retain desirable properties of flexibility and softness, often important properties for aesthetic or functional reasons that are dependent on the application in which such compositions are used. For example, commercial carpet tiles are often back coated with a flexible polymer composition that must be low cost, flexible, low shore hardness, dense, have acceptable adhesion properties to the carpet backing substrate onto which the polymer composition is applied, and retain good dimensional stability. In the case of Sample 2 above, this composition would serve as an excellent commercial carpet tile "cap coat" as not only does it possess all of the aforementioned properties when melt extrusion coated onto the back of a commercial carpet backing but it also contains a high post consumer content due to the presence of the recycled asphalt mineral filler in the polymer composition. This high post consumer content is an increasingly important content property to have for many commercial applications, as carpet type products are considered more environmentally sustainable, which is an increasingly important feature as it has become generally required in commercial building materials today.

An enhanced micronized inorganic filler (EMIFIL) according to a preferred embodiment of the invention can have the following properties:
Specific Gravity: 2.4
Particle Size: 325 mesh screen or finer or coarser with up to 100% passing specified screen
The composition preferably comprises:

| | |
|---|---|
| Limestone (CaCO₃), (Mg, Al)Si₃O₁₂, SiO₂ | 45-95% |
| Dolomite CaMg(CO₃)₂, SiO₂ | 0-50% |
| Silicon Dioxide SiO₂ | 0-15% |

The enhanced micronized inorganic filler (EMIFIL) is compatible in most conventional commodity resins such as polyolefins, ethylene vinyl acetates, engineering resins, such as polyamides or polyesters, and latex or acrylic emulsions at levels in excess of 40% loading.

The composition can be used in a variety of practical applications. In one application, the EMIFIL can be used in thermoplastic polyolefin (TPO) carpet backing to provide a minimum post consumer recycled content of 1% to 90%. Another application is as a low cost filler for high recycled content extruded polymer roof tiles. Another application is as a low cost filler for landscaping features, pavers, blocks and edging.

Yet another application is as a low cost filler for high consumer content latex or acrylic emulsion back coating and interlayer adhesives. Another application is as a low cost filler for elastomers including but not limited to, natural rubber, styrene butadiene rubber, ethylene propylene diene monomer (EPDM) rubber, chloroprene rubber, nitrile rubber and ethylene vinyl acetate.

Yet another application is as a filler and extender for asphalt sealing and repair materials. Another application is as a low cost filler for high consumer content, which replaces other virgin industrial fillers. Another application is as an extender and filler in hot melt adhesive applications.

According to an embodiment of the invention, the enhanced micronized inorganic filler (EMIFIL) described above can be used as a filler in a formulation particularly suited for use in roofing tiles, the formulation comprising the EMIFIL, a molding carrier resin such as high density polyethylene, and a flame retardant such as chlorinated polyethylene. Preferably, the formulation comprises by weight:
EMIFIL 70-75%
High Density Polyethylene 15-20%
Chlorinated Polyethylene (Tyrin 0136) 5%
Standard HALS UV protectant 0.25-0.5%
Pigment 1-3%

The above materials are dry blended and can be compounded using a higher shear dispersion process using a twin screw co-rotator extruder, or a Farrel Continuous Mixer, or a tangential Banbury mixer. The material is melt mixed to 300-350 F, pelletized, and injection molded into faux slate tiles. The pellets are added to a standard plastics injection molding machine with mold fabricated to resemble slate roof tile, extrusion on pantille tiles with a single screw extruder with fabricated die to profile extrude roofing tiles.

The above formulation provides a low cost, high post consumer content roofing tile with excellent fire retardant properties. The formulation can attain an 'A' rating for fire proofing under ASTME 108.

A high post consumer content mineral filler based on micronized recycled asphalt paving is described above. Various changes can be made to the invention without departing from its scope. The above description of the preferred embodiments and best mode of the invention are provided for the purpose of illustration only and not limitation—the invention being defined by the following claims and equivalents thereof.

What is claimed is:

1. A composition adapted for use as a filler in an end use product comprising barium sulfate, an alpha polyethylene elastomer, and recycled asphalt grounded to a particle size wherein at least thirty percent of the recycled asphalt can pass through a 325 mesh screen, and wherein the end use product is selected from the group consisting of carpet backings, textiles, needle punch carpet tiles, styrene butadiene rubber latex, ethylene vinyl acetate latex, polypropylene resins, polypropylene/polyethylene resins, polyvinyl chloride compounds, roof tiles, adhesives, elastomers, and asphalt sealing.

2. A composition according to claim 1, wherein the end use product has post consumer content of at least 10%.

3. A composition according to claim 1, wherein the asphalt filler is derived from limestone gravel.

4. A composition according to claim 1, further comprising olefinic processing oil, and a polypropylene homopolymer.

5. A composition according to claim 1, wherein the barium sulfate has a particle size of substantially 325 mesh screen.

6. A composition according to claim 1, wherein the composition comprises about 45% by weight recycled asphalt.

7. A composition according to claim 1, wherein the composition comprises about 20% by weight barium sulfate.

8. A composition according to claim 1, wherein the composition comprises about 33% by weight of the alpha olefin polyethylene elastomer.

9. A composition according to claim 1, wherein the composition comprises:
   (a) about 45% by weight recycled asphalt filler;
   (b) about 20% by weight barium sulfate; and
   (c) about 33% by weight of the alpha olefin polyethylene elastomer.

10. A composition according to claim 1, further comprising a polyfluoroelastomer processing aid.

11. A composition adapted for use as a filler in an end use product comprising recycled asphalt filler grounded to a particle size wherein at least thirty percent of the recycled asphalt filler can pass through a 325 mesh screen, and wherein the end use product is selected from the group consisting of carpet backings, textiles, needle punch carpet tiles, styrene butadiene rubber latex, ethylene vinyl acetate latex, polypropylene resins, polypropylene/polyethylene resins, polyvinyl chloride compounds, roof tiles, adhesives, elastomers, and asphalt sealing, wherein the composition comprises:
   (a) about 45% by weight recycled asphalt filler;
   (b) about 20% by weight barium sulfate;
   (c) about 33% by weight of the alpha olefin polyethylene elastomer;
   (d) about 1% by weight of the olefinic processing oil; and
   (e) about 1% by weight of the polypropylene homopolymer.

12. A composition according to claim 11, further comprising a polyfluoroelastomer processing aid.

13. A composition according to claim 11, wherein the asphalt filler comprises calcium carbonate.

14. A composition according to claim 13, wherein the asphalt filler further comprises calcium magnesium carbonate.

15. A composition according to claim 14, wherein the asphalt filler further comprises silicon dioxide.

16. A composition according to claim 11, wherein the end use product has post consumer content of at least 10%.

17. A composition according to claim 11, wherein the asphalt filler is derived from limestone gravel.

* * * * *